United States Patent
Zorh et al.

(10) Patent No.: US 10,690,342 B2
(45) Date of Patent: Jun. 23, 2020

(54) APPARATUS FOR SPRAYING COOLING WATER, APPARATUS AND METHOD FOR MANUFACTURING MINERAL FIBER

(71) Applicants: Billion Sung Hoon Zorh, Gyeonggi-do (KR); Nam Sook Chough, Seol (KR); Ato Andoh, Stafford, VA (US)

(72) Inventors: Billion Sung Hoon Zorh, Pocheon-si (KR); Nam Sook Chough, Seoul (KR)

(73) Assignees: Billion Sung Hoon Zorh, Gyeonggi-do (KR); Nam Sook Chough, Seoul (KR); Ato Andoh, Stafford, VA (US)

( * ) Notice: Subject to any disclaimer, the term of this patent is extended or adjusted under 35 U.S.C. 154(b) by 731 days.

(21) Appl. No.: 15/353,799

(22) Filed: Nov. 17, 2016

(65) Prior Publication Data

US 2018/0134608 A1    May 17, 2018

(51) Int. Cl.
| | |
|---|---|
| C03B 37/10 | (2006.01) |
| C03B 37/04 | (2006.01) |
| C03B 37/16 | (2006.01) |
| F23J 1/02 | (2006.01) |
| D04H 1/736 | (2012.01) |
| C03B 5/12 | (2006.01) |
| C03B 37/05 | (2006.01) |
| D04H 1/4226 | (2012.01) |

(52) U.S. Cl.
CPC .............. *F23J 1/02* (2013.01); *C03B 5/12* (2013.01); *C03B 37/055* (2013.01); *D04H 1/4226* (2013.01); *D04H 1/736* (2013.01); *F23J 2219/80* (2013.01)

(58) Field of Classification Search
CPC ....... C03B 37/04; C03B 37/05; C03B 37/055; F23J 1/02; F23J 2219/80; D04H 1/4226; D04H 1/736
See application file for complete search history.

(56) References Cited

U.S. PATENT DOCUMENTS

| | | | | |
|---|---|---|---|---|
| 4,668,267 A | * | 5/1987 | Savary | .................... C03C 25/12 156/62.4 |
| 5,123,941 A | * | 6/1992 | Lauren | .................... C03B 5/025 65/488 |
| 5,131,935 A | | 7/1992 | Debouzie et al. | |

FOREIGN PATENT DOCUMENTS

| | | |
|---|---|---|
| JP | H0390668 A | 4/1991 |
| KR | 101080047 B1 | 11/2011 |
| KR | 101091837 B1 | 12/2011 |
| WO | 91/10626 A1 | 7/1991 |

* cited by examiner

*Primary Examiner* — Joseph S Del Sole
*Assistant Examiner* — Mohamed K Ahmed Ali
(74) *Attorney, Agent, or Firm* — Eversheds Sutherland (US) LLP

(57) ABSTRACT

Provided is a cooling water spray apparatus including a plurality of spinners disposed to be adjacent to one another along a travel path of a target to be cooled, and a plurality of cooling water spray holes provided on each spinner and configured to spray cooling water. The plurality of spinners may be non-overlappingly disposed with respect to one another.

12 Claims, 9 Drawing Sheets

APPARATUS FOR SPRAYING COOLING WATER, APPARATUS AND METHOD FOR MANUFACTURING MINERAL FIBER

BACKGROUND

1. Field of the Invention

Embodiments of the present invention relate to a cooling water spray apparatus and a mineral fiber manufacturing apparatus including the same, and more particularly, to a cooling water spray apparatus capable of efficiently manufacturing mineral fibers by recycling used coal ashes and a mineral fiber manufacturing apparatus including the same. Embodiments relate to an apparatus and method for manufacturing mineral fibers, and more particularly, to a mineral fiber manufacturing apparatus and method that may homogeneously collect mineral fibers in a bulk state right after mineral fiberization using a drum-type collector.

2. Description of the Related Art

In general, a thermoelectric power plant refers to a facility that converts, to electric energy, energy generated from fossil fuels such as coal, heavy oil, and the like.

A large-scale thermoelectric power plant is equipped with, for example, a boiler configured to generate vapor and a generator configured to convert rotatory power to electricity. In contrast, a gas turbine and a diesel engine have been used for relatively small-scale self-thermoelectric power generation.

Coal employed as a main material in the thermoelectric power plant includes carbon, oxygen, hydrogen, nitrogen, and the like, in chemical aspects, and also contains the large quantity of organic and inorganic compounds. The organic compounds refer to sediment left after vegetable materials buried underground go through biological, physical, and chemical processes, and may also be referred to as maceral.

In general, a thermoelectric power plant using coal as a main fuel involves feeding coal to a boiler in large quantities, thereby combusting the large quantity of coal. Accordingly, the thermoelectric power plant generates the electricity by generating high temperature and high pressure vapor and by supplying the generated vapor to a vapor turbine. Here, coal ashes resulting from the combustion generate about 5 to 22% of incompletely combusted materials. Such waste material is classified into bottom ashes and fly ashes.

A portion of the fly ashes have been used as a component of Portland cement corresponding to raw materials for cement and the bottom ashes corresponding to inorganic residues have been used as seal filling materials. However, there is a growing concern as to the environmental pollution by the fly ashes and the bottom ashes.

To reduce effects of environmental pollution, research is being conducted into recycling waste discharged from a thermoelectric power plant.

For example, Korean Patent Application No. 10-2011-0092363, filed on Sep. 14, 2011, discloses a method for manufacturing a mineral pulp by use of scrapped coal materials.

SUMMARY

Embodiments provide a cooling water spray apparatus capable of smoothly manufacturing mineral fibers by improving the cooling efficiency of cooling water sprayed from cooling water spray holes and thereby preventing the carbonization of synthetic resin, and a mineral fiber manufacturing apparatus including the cooling water spray apparatus.

Embodiments also provide a cooling water spray apparatus in which a plurality of spinners non-overlappingly disposed with respect to one another has differing rotation directions, rotational speeds, and diameters, and a mineral fiber manufacturing apparatus including the cooling water spray apparatus.

Embodiments also provide a cooling water spray apparatus in which cooling water spray holes are arranged on a slope that is provided on a top surface of each of a plurality of spinners, thereby enabling cooling water to be obliquely sprayed from the cooling water spray holes in a radial form, and a mineral fiber manufacturing apparatus including the cooling water spray apparatus.

Embodiments also provide a cooling water spray apparatus capable of fiberizing molten metal and guiding a travel path of the molten metal by including a plurality of air spray holes at an outer side of a spinner or a plurality of cooling water spray holes, and a mineral fiber manufacturing apparatus including the cooling water spray apparatus.

Embodiments provide a mineral fiber manufacturing apparatus and method that may uniformly spread mineral fibers in a bulk state manufactured in a mineral fiber manufacturer over the outer peripheral surface of a collector.

Embodiments also provide a mineral fiber manufacturing apparatus and method that may easily configure a drum-type collector by wrapping a net around a rotating body.

Embodiments also provide a mineral fiber manufacturing apparatus and method that may separate mineral fibers from a collector using a separator in contact with the outer peripheral surface of the collector and may transfer the mineral fibers to a conveyor.

Embodiments also provide a mineral fiber manufacturing apparatus and method including a drum-type collector that may manufacture a homogeneous mineral fiber product using a mineral fiber processor by transporting mineral fibers uniformly spread over the collector.

According to an embodiment, there is provided a cooling water spray apparatus including: a plurality of spinners disposed to be adjacent to one another along a travel path of a target to be cooled; and a plurality of cooling water spray holes provided on each spinner and configured to spray cooling water. The plurality of spinners may be non-overlappingly disposed with respect to one another.

According to an aspect, neighboring spinners among the plurality spinners may rotate in opposite directions.

According to an aspect, a diameter of a spinner disposed in an upper portion among the plurality of spinners may be less than a diameter of a spinner disposed in a lower portion among the plurality of spinners.

According to an aspect, a rotational speed of a spinner disposed in an upper portion among the plurality of spinners may be greater than a rotational speed of a spinner disposed in a lower portion among the plurality of spinners.

According to an aspect, the number of cooling water spray holes formed in a spinner disposed in an upper portion among the plurality of spinners may be greater than the number of cooling water spray holes formed in a spinner disposed in a lower portion among the plurality of spinners.

According to an aspect, a slope may be provided on a top surface of each of the plurality of spinners and downwardly slanted from a center of a corresponding spinner toward an outer periphery of the spinner at an angle of 25 degrees to 35 degrees.

According to an aspect, the plurality of cooling water spray holes may be arranged on the slope at equal intervals from the center of the spinner, so that the cooling water is obliquely sprayed from the plurality of cooling water spray holes toward the target to be cooled.

According to an embodiment, there is provided a mineral fiber manufacturing apparatus including: a furnace including an inlet via which raw materials for manufacturing mineral fibers are inserted and an outlet via which molten metal including the inserted raw materials in a melted form is discharged; a mineral fiber manufacturer configured to manufacture the molten metal discharged via the outlet of the furnace, into mineral fibers; and a collector configured to collect the mineral fibers discharged from the mineral fiber manufacturer. The mineral fiber manufacturer may include a plurality of spinners disposed to be adjacent to one another along a travel path of the molten metal.

According to an aspect, neighboring spinners among the plurality of spinners may rotate in opposite directions.

According to an aspect, a slope may be provided on a top surface of each of the plurality of spinners and downwardly slanted from a center of a corresponding spinner toward an outer periphery of the spinner at an angle of 25 degrees to 35 degrees.

According to an aspect, a plurality of cooling water spray holes may be arranged on the slope at equal intervals from the center of the spinner, so that the cooling water is obliquely sprayed from the plurality of cooling water spray holes toward the molten metal.

According to an aspect, a diameter of a spinner disposed in an upper portion among the plurality of spinners may be less than a diameter of a spinner disposed in a lower portion among the plurality of spinners.

According to an aspect, a rotational speed of a spinner disposed in an upper portion among the plurality of spinners may be greater than a rotational speed of a spinner disposed in a lower portion among the plurality of spinners.

According to an aspect, the number of cooling water spray holes formed in a spinner disposed in an upper portion among the plurality of spinners may be greater than the number of cooling water spray holes formed in a spinner disposed in a lower portion among the plurality of spinners.

According to an aspect, the plurality of spinners may include: a first spinner disposed on a side in which the molten metal flows; a second spinner disposed to be downwardly separate from the first spinner; a third spinner disposed to be downwardly separate from the second spinner; and a fourth spinner disposed to be downwardly separate from the third spinner. The first spinner, the second spinner, the third spinner, and the fourth spinner may be arranged in a zigzagged form.

According to an aspect, a rotation direction of the first spinner may be opposite to a rotation direction of the second spinner, the rotation direction of the second spinner may be opposite to a rotation direction of the third spinner, and the rotation direction of the third spinner may be opposite to a rotation direction of the fourth spinner.

According to an aspect, a diameter of each of the first spinner and the second spinner may be less than a diameter of each of the third spinner and the fourth spinner, and a rotational speed of each of the first spinner and the second spinner may be greater than a rotational speed of each of the third spinner and the fourth spinner.

According to an aspect, the number of cooling water spray holes formed in each of the first spinner, the second spinner, and the third spinner may be greater than the number of cooling water spray holes formed in the fourth spinner.

According to an aspect, a plurality of air spray holes may be provided at an outer side of each of the plurality of spinners, the molten metal may be fiberized by the air sprayed via the plurality of air spray holes and the travel path of the molten metal may be guided.

According to an aspect, a plurality of synthetic resin spray holes may be provided at an outer side of each of the plurality of spinners, and mineral fibers manufactured by the mineral fiber manufacturer may be attachable due to synthetic resin sprayed via the plurality of synthetic resin spray holes.

According to an embodiment, there is provided a mineral fiber manufacturing apparatus including a furnace including an inlet through which coal briquette and cokes for manufacturing mineral fibers are inserted and a molten metal outlet through which a molten metal in which the coal briquette is melted is discharged; a mineral fiber manufacturer disposed below the furnace and configured to manufacture the molten metal discharged through the molten metal outlet into mineral fibers in a bulk state; and a collector disposed to be separate from the mineral fiber manufacturer, and configured to collect the mineral fibers in the bulk state manufactured in the mineral fiber manufacturer, wherein the collector includes a rotating body and the mineral fibers in the bulk state are uniformly spread over the outer peripheral surface of the rotating body.

The collector may further include a net configured to wrap around the rotating body, and the outer peripheral surface of the collector may be flattened by the net.

The rotating body may include a rotating shaft extending in a direction vertical to a heading direction of the mineral fibers; a plurality of rotating wings extending from both ends of the rotating shaft in a radial direction; a circular frame configured to connect ends of the plurality of rotating wings at both ends of the rotating shaft; and a plurality of plates disposed to be separate from each other along the outer peripheral surface of the circular frame and protruding from the outer peripheral surface of the circular frame in a radial direction. The net may be provided to wrap around a portion of or an entirety of the rotating body.

The mineral fibers in the bulk state manufactured in the mineral fiber manufacturer may move in a rotating direction of the rotating body in contact with the net.

An upper end of the collector may be disposed to be above the mineral fiber manufacturer and a lower end of the collector may be disposed to be below the mineral fiber manufacturer.

The mineral fiber manufacturing apparatus may further include a conveyor configured to transport the mineral fibers collected by the collector. The conveyor may be disposed to face the mineral fiber manufacturer based on the collector.

The mineral fiber manufacturing apparatus may further include a separator provided between the collector and the conveyor. One end of the separator may be in contact with the outer peripheral surface of the collector and another end of the separator may be disposed on a top surface of the conveyor.

The mineral fibers moved by rotation of the rotating body may be separated from the collector and transferred to the conveyor.

The mineral fibers transferred to the conveyor may be transported to a mineral fiber processor, and the mineral fiber processor may include a vibrating element configured to vibrate the mineral fibers; a forming element configured to press the mineral fibers; a cutting element configured to cut the mineral fibers; and a packaging element configured to package the mineral fibers.

According to an embodiment, there is provided a mineral fiber manufacturing method including inserting coal briquette and cokes for manufacturing mineral fibers in a furnace; melting the coal briquette in the furnace; discharging a molten metal in which the coal briquette is melted from the furnace; manufacturing the molten metal into mineral fibers using a mineral fiber manufacturer; guiding the mineral fibers manufactured in the mineral fiber manufacturer to a collector; rotating the collector; transferring the mineral fibers to a conveyor; and transporting the mineral fibers to a mineral fiber processor by way of the conveyor. The rotating of the collector may include moving the mineral fibers in a rotating direction of the collector along the outer peripheral surface of the collector.

The rotating of the collector may include uniformly spreading the mineral fibers in a bulk state manufactured in the mineral fiber manufacturer over the outer peripheral surface of the collector.

The mineral fiber manufacturing method may further include separating the mineral fibers from the collector between the rotating of the collector and the transferring of the mineral fibers.

The separating of the mineral fibers may include separating the mineral fibers from the collector using a separator in contact with the outer peripheral surface of the collector and transferring the separated mineral fibers to the conveyor.

After transporting the mineral fibers to the mineral fibers, the mineral fiber manufacturing method may further include vibrating the mineral fibers; pressing the vibrated mineral fibers; cutting the pressed mineral fibers; and packaging the cut mineral fibers.

EFFECTS

According to a cooling water spray apparatus and a mineral fiber manufacturing apparatus including the same according to embodiments, it is possible to smoothly manufacture mineral fibers by improving the cooling efficiency of cooling water sprayed from cooling water spray holes and thereby preventing the carbonization of synthetic resin.

Also, according to a cooling water spray apparatus and a mineral fiber manufacturing apparatus including the same according to embodiments, a plurality of spinners non-overlappingly disposed with respect to one another may have differing rotation directions, rotational speeds, and diameters.

Also, according to a cooling water spray apparatus and a mineral fiber manufacturing apparatus including the same according to embodiments, since cooling water spray holes are arranged on a slope that is provided on a top surface of each of a plurality of spinners, cooling water may be obliquely sprayed from the cooling water spray holes in a radial form.

Also, according to a cooling water spray apparatus and a mineral fiber manufacturing apparatus including the same according to embodiments, it is possible to fiberize molten metal and guide a travel path of the molten metal by providing a plurality of air spray holes at an outer side of a spinner or a plurality of cooling water spray holes.

According to a mineral fiber manufacturing apparatus and method according to embodiments, it is possible to uniformly spread mineral fibers in a bulk state manufactured in a mineral fiber manufacturer over the outer peripheral surface of a collector.

Also, according to a mineral fiber manufacturing apparatus and method according to embodiments, it is possible to easily configure a drum-type collector by wrapping a net around a rotating body.

Also, according to a mineral fiber manufacturing apparatus and method according to embodiments, it is possible to separate mineral fibers from a collector using a separator in contact with the outer peripheral surface of the collector and to transfer the mineral fibers to a conveyor.

Also, according to a mineral fiber manufacturing apparatus and method according to embodiments, it is possible to manufacture a homogeneous mineral fiber product using a mineral fiber processor by transporting mineral fibers uniformly spread over the collector.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
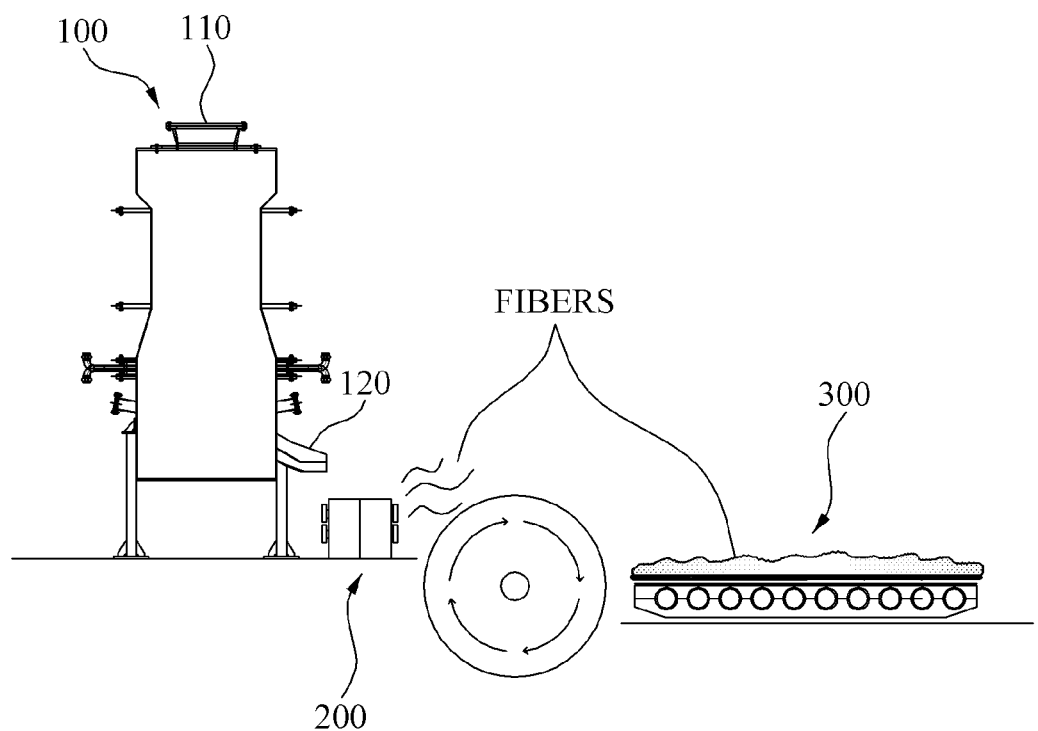
FIG. 1 illustrates a mineral fiber manufacturing apparatus according to an embodiment.

Reference will now be made in detail to exemplary embodiments of the present invention, examples of which are illustrated in the accompanying drawings, wherein like reference numerals refer to like elements throughout. Exemplary embodiments are described below to explain the present invention by referring to the figures.

Figure 2:
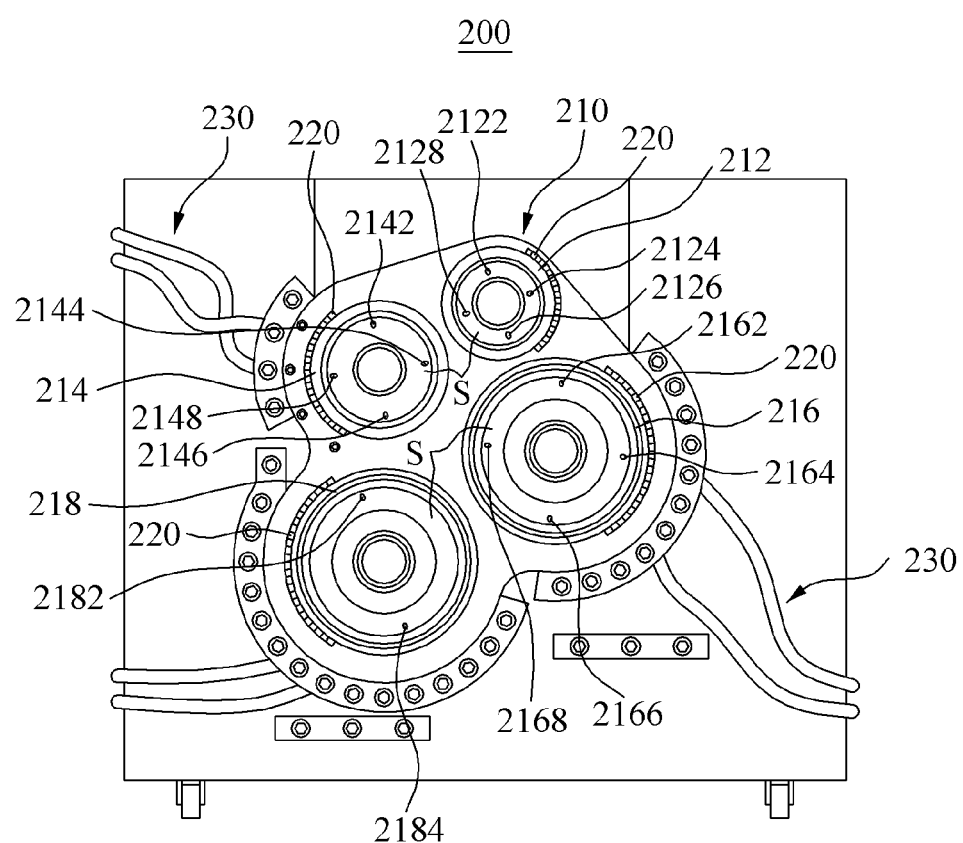
FIG. 2 is a cross-sectional view illustrating a mineral fiber manufacturer in a mineral fiber manufacturing apparatus according to an embodiment.
Figure 3:
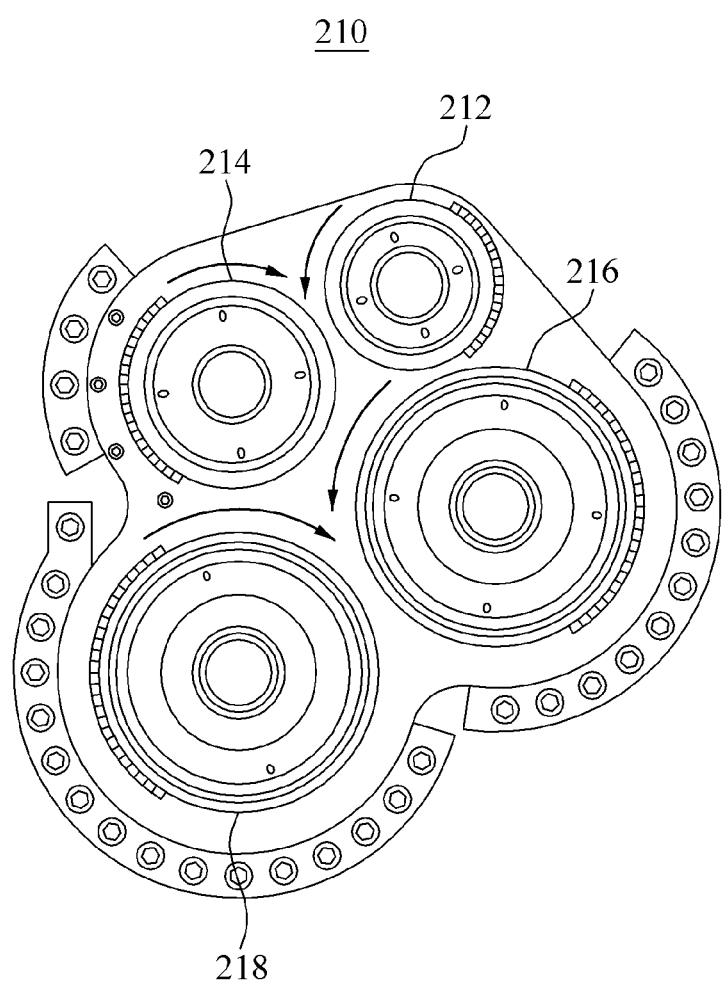
FIG. 3 illustrates an example of a plurality of rotating spinners.
Figure 4:
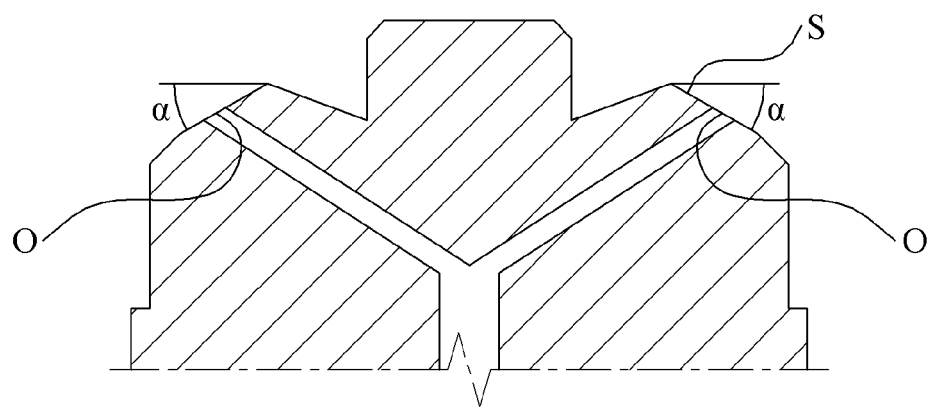
FIG. 4 illustrates an example of a slope provided on a spinner.
Figure 5:
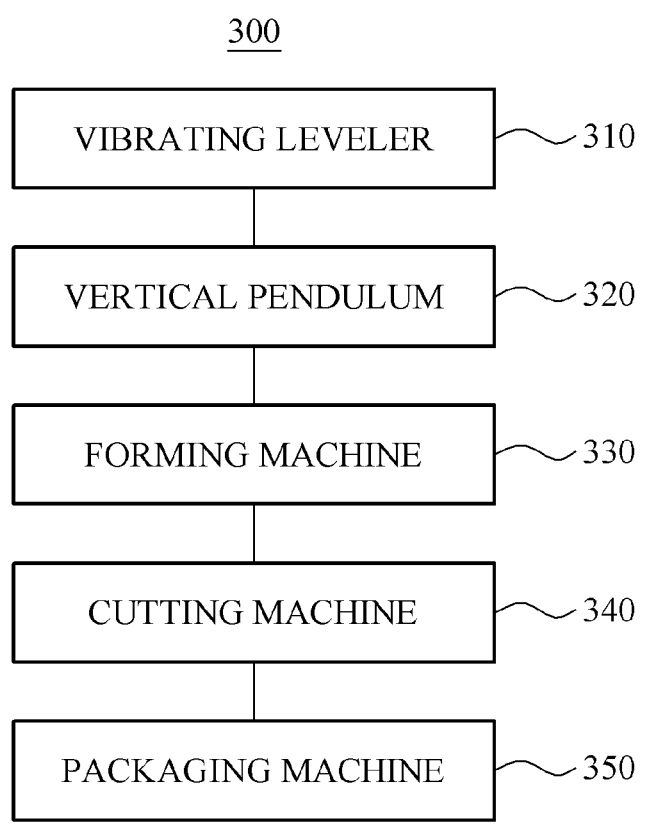
FIG. 5 is a diagram illustrating a configuration of a collector in a mineral fiber manufacturing apparatus according to an embodiment.

FIG. 1 illustrates a mineral fiber manufacturing apparatus according to an embodiment, FIG. 2 is a cross-sectional view illustrating a mineral fiber manufacturer in a mineral fiber manufacturing apparatus according to an embodiment, FIG. 3 illustrates an example of a plurality of rotating spinners, FIG. 4 illustrates an example of a slope provided on a spinner, and FIG. 5 is a diagram illustrating a configuration of a collector in a mineral fiber manufacturing apparatus according to an embodiment.

Referring to FIG. 1, a mineral fiber manufacturing apparatus 10 may include a furnace 100, a mineral fiber manufacturer 200, and a collector 300.

The furnace 100 may include an inlet 110 and an outlet 120.

The inlet 110 may be provided at an upper end of the furnace 100, and the outlet 120 may be provided on one side to be adjacent to a lower end of the furnace 100.

Raw materials for manufacturing mineral fibers may be inserted in the furnace 100 via the inlet 110.

Here, the raw materials may include coal briquet and cokes.

The coal briquet may be produced by mixing and pressurizing coal ashes, dolomite ($CaMg(CO_3)_2$) and limestone.

In detail, the coal ashes refer to residual ashes after burning coal in a thermoelectric power plant and the like, and may be classified based on sizes of particles of the coal ashes and thereby maintained.

The dolomite $CaMg(CO_3)_2$ includes barytocalcite in which calcium carbonate and magnesium carbonate are mixed at a 1:1 ratio, and indicates a rhombus crystal, and a crystal face is slightly curved. Further, the dolomite has a gradient of 3.5 to 4, has a weight of 2.8 to 2.9, and has a complete split in a rhombus direction.

The limestone generally refers to fine-grained and bulky apedal rock. An appearance color of limestone may be white or gray in color, and with dark gray or black impurities.

The aforementioned coal ashes, dolomite and limestone may be transported and stored based on a unit of a particle size having a predetermined range in order to be uniformly mixed. In this instance, a plurality of measuring devices may be provided in a storage of coal ashes, dolomite and limestone.

Even though not illustrated in detail, a coal briquet manufacturer (not shown) for manufacturing coal briquet may be provided. Coal ashes, dolomite and limestone may be concurrently fed internally to the coal briquet manufacturer at a predetermined mixture ratio. In this instance, the predetermined quantity of special binding materials may also be inserted in the coal briquet manufacturer.

Also, the mixture ratio may be selectively adjusted as necessary, and a mixture ratio between each raw material and the special binding material may also be variably applied.

The coal briquet manufacturer may manufacture the coal briquet in a solid fuel type by compressing the mixture of coal ashes, dolomite, limestone and the special binding materials.

The manufactured coal briquet may be transported to a coal briquet storage (not shown) through a conveyor (not shown) and be stored therein.

The coal briquet stored in the coal briquet storage may be inserted in a quantitative feeder (not shown) through a conveyor (not shown).

Here, cokes being stored in a cokes storage may also be inserted in the quantitative feeder through a conveyor (not shown).

An appearance of cokes may be black with gray shading and also has a metallic gloss. The cokes includes fixed carbon as a primary component and contains trace amounts of ash content and volatile matter. In terms of technical analysis values, the cokes generally includes 80 to 94% fixed carbon, 6 to 18% ash content, and 0.5 to 2% volatile matter. In terms of elementary analysis values, the cokes includes 80 to 92% carbon, 1 to 1.5% hydrogen, 0.5 to 0.9% nitrite, 0.4 to 0.7% oxygen, 0.5 to 1% sulfur, and 6 to 18% ash content.

Also, cokes has a caloric power of 6000 to 7500 kilocalories (kcal) per 1 kilogram (kg), and has an ignition temperature of 400 to 600° C.

The cokes may be additionally fed in order to melt the coal briquet.

Each of the quantitative coal briquet and cokes may be inserted from the quantitative feeder in the furnace 100 through the inlet 110 of the furnace 100 through a conveyor (not shown).

While the raw materials for manufacturing mineral fibers, that is, coal briquet and cokes fed through the inlet 110 of the furnace 100 is going through a process of a pre-heating zone, a reducing zone, a combusting zone, and a melting zone, organic compounds of mineral fibers contained in the coal briquet may be melted.

Here, a controller (not shown) may control the quantity of air and oxygen to be inserted in order to sufficiently excessively supply oxygen in the reducing zone and thereby increase the combustion efficiency.

The controller may control an inside temperature and an exhaust temperature of the furnace 100, so that the inside temperature of the furnace 100 is maintained at the temperature of about 1500° C., and the exhaust temperature of the furnace 100 is maintained at the temperature of about 300 to 500° C.

Here, the inside temperature of the furnace 100 may reach a high temperature enough to melt coal briquet and cokes. Accordingly, an outside iron plate of the furnace 100 and refractory built inside the furnace 100 may be designed to have a sufficient thickness to be capable of enduring a high temperature inside the furnace 100. Depending on necessity, a variety of cooling methods may be employed.

Further, the controller may control a melting rate within the furnace 100, the quantity of raw materials to be inserted through the inlet 110 of the furnace 100, and the like.

Through the aforementioned process, the inserted materials may be discharged in a melted state through the outlet 120 of the furnace 100.

Hereinafter, the melted matter discharged through the outlet 120 is referred to as a molten metal.

The molten metal may be prepared at the temperature of about 1500 to 1600° C., for example, at the temperature of about 1550° C.

The high temperature molten metal may be fed to the mineral fiber manufacturer 200.

The mineral fiber manufacturer 200 may be disposed below the outlet 120 of the furnace 100.

Referring to FIG. 2, the mineral fiber manufacturer 200 may include a spinner assembly 210.

The spinner assembly 210 may be made of a material capable of sufficiently enduring a temperature of molten metal. For example, the spinner assembly 210 may be made of stainless steel.

The molten metal discharged through the outlet unit 120 of the furnace 100 may flow along a top surface of the spinner assembly 210. Alternatively, when a plurality of spinner assemblies 210 is provided, the molten metal may flow in a space between the plurality of spinner assemblies 210.

The molten metal flowing on the spinner assembly 210 may quickly rotate by the spinner assembly 210.

Mineral fibers may be manufactured from the molten metal by spraying air and synthetic resin through a plurality of air spray holes 220 and a plurality of synthetic resin spray holes 230 provided at an outer side of each of spinners included in the spinner assembly 210.

For example, the spinner assembly 210 may include a plurality of spinners, for example, a first spinner 212, a second spinner 214, a third spinner 216, and a fourth spinner 218, disposed to be adjacent to one another along a travel path of the molten metal.

Even though FIG. 2 illustrates that the mineral fiber manufacturer 200 includes four spinners, for example, the first spinner 212, the second spinner 214, the third spinner 216, and the fourth spinner 218, the number of spinners is not limited thereto.

Hereinafter, a description will be made based on an example in which four spinners, for example, the first spinner 212, the second spinner 214, the third spinner 216, and the fourth spinner 218, are provided to the mineral fiber manufacturer 200.

The spinner assembly 210 may include the first spinner 212, the second spinner 214, the third spinner 216, and the fourth spinner 218.

The first spinner 212 may be disposed in an upper portion of the mineral fiber manufacturer 200, and may be disposed on a side in which the molten metal discharged through the outlet 120 of the furnace 100 flows.

The second spinner 214 may be disposed to be separate at a left-lower end of the first spinner 212, and the molten metal may be guided to the second spinner 214 through the first spinner 212.

The third spinner 216 may be disposed to be separate at a right-lower end of the second spinner 214, and the molten metal may be guided to the third spinner 216 through the second spinner 214.

The fourth spinner 218 may be disposed to be separate at a left-lower end of the third spinner 216, and the molten metal may be guided to the fourth spinner 218 through the third spinner 216.

As described above, the first spinner 212, the second spinner 214, the third spinner 216, and the fourth spinner 218 may be non-overlappingly disposed with respect to one another, and may be arranged in, for example, a zigzagged form.

The above arrangement of the first spinner 212, the second spinner 214, the third spinner 216, and the fourth spinner 218 enables the molten metal to be uniformly cooled while passing through the spinner assembly 210, thereby improving the mineral fiber manufacturing efficiency.

In detail, since a stay time of the molten metal in the mineral fiber manufacturer 200 is extendable while the molten metal sequentially passes the first spinner 212, the second spinner 214, the third spinner 216, and the fourth spinner 218, it is possible to improve the mineral fiber manufacturing efficiency.

Also, diameters of the first spinner 212, the second spinner 214, the third spinner 216, and the fourth spinner 218 may be provided to gradually increase from an upper portion to a lower portion.

For example, a diameter of a spinner disposed in an upper portion among a plurality of spinners may be less than a diameter of a spinner disposed in a lower portion among the plurality of spinners.

In detail, among the first spinner 212, the second spinner 214, the third spinner 216, and the fourth spinner 218, the first spinner 211 may have a smallest diameter. The second spinner 214 may have a diameter greater than the diameter of the first spinner 212, the third spinner 216 may have a diameter greater than the diameter of the second spinner 214, and the fourth spinner 218 may have a diameter greater than the diameter of the first spinner 212 and the diameter of the second spinner 214, and corresponding to the diameter of the third spinner 216.

Also, rotational speeds of the first spinner 212, the second spinner 214, the third spinner 216, and the fourth spinner 218 may be individually controlled.

For example, a rotational speed of a spinner disposed in an upper portion among a plurality of spinners may be greater than a rotational speed of a spinner disposed in a lower portion among the plurality of spinners.

In detail, among the first spinner 212, the second spinner 214, the third spinner 216, and the fourth spinner 218, a rotational speed of the first spinner 212 may be fastest and rotational speeds of the second spinner 214, the third spinner 216, and the fourth spinner 218 may gradually decrease.

However, it is only an example and thus, the rotational speeds of the first spinner 212, the second spinner 214, the third spinner 216, and the fourth spinner 218 are not limited thereto and may be differently controlled depending on embodiments.

The aforementioned diameters and rotational speeds of the first spinner 212, the second spinner 214, the third spinner 216, and the fourth spinner 218 may play an important role in a centrifugal force with which the spinner assembly 210 affects the molten metal.

The centrifugal force may affect the cooling efficiency of molten metal and at the same time, may affect the manufacturing efficiency of mineral fiber manufactured by the mineral fiber manufacturer 200.

The centrifugal force is in proportion to the diameter and the rotational speed of the spinner assembly 210. Thus, for example, the centrifugal force of the spinner assembly 210 may be controlled by individually controlling the diameter and the rotational speed of the spinner assembly 210.

In addition, since the plurality of cooling water spray holes is provided on each of spinners included in the spinner assembly 210, the centrifugal force may affect a spray speed and a spray amount of cooling water sprayed from the plurality of cooling water spray holes.

Referring to FIG. 3, neighboring spinners among a plurality of spinners, for example, the first spinner 212, the second spinner 214, the third spinner 216, and the fourth spinner 218, may rotate in opposite directions.

That is, a rotation direction of the first spinner 212 may be opposite to a rotation direction of the second spinner 214, the rotation direction of the second spinner 214 may be opposite to a rotation direction of the third spinner 216, and the rotation speed of the third spinner 216 may be opposite to a rotation direction of the fourth spinner 218.

For example, when the first spinner 212 rotates clockwise, the second spinner 214 may rotate counterclockwise, the third spinner 216 may rotate clockwise, and the fourth spinner 218 may rotate counterclockwise.

In contrast, when the first spinner 212 rotates counterclockwise, the second spinner 214 may rotate clockwise, the third spinner 216 may rotate counterclockwise, and the fourth spinner 218 may rotate clockwise.

As described above, rotation directions of neighboring spinners may be opposite to one another. The first spinner 212 and the third spinner 216 may rotate in the same direction, and the second spinner 214 and the fourth spinner 218 may rotate in the same direction.

The opposite direction between the neighboring spinners may affect a travel direction of the molten metal, and may serve to offset the centrifugal force acting on the molten metal. Accordingly, the molten metal may move forward from the first spinner 212 toward the fourth spinner 218 on the spinner assembly 210.

The plurality of cooling water spray holes may be provided on a top surface of the spinner assembly 210 constructed as above.

Referring to FIG. 3, a plurality of cooling water spray holes O may be provided on a slope S of the spinner assembly 210.

The slope S may be formed to be downwardly slanted from a center of a corresponding spinner toward an outer periphery of the spinner.

For example, an angle α of the slope S may be set to be 25 degrees to 35 degrees from the center of the spinner. Desirably, the angle α of the slope S may be set to be about 30 degrees.

By providing the plurality of cooling water spray holes O on the slope S, the cooling water may be obliquely sprayed from the plurality of cooling water spray holes O over an upper portion.

Accordingly, it is possible to improve the molten metal cooling efficiency by cooling water by further expanding a spray area of the cooling water.

In particular, the cooling water sprayed from the plurality of cooling water spray holes O may prevent the carbonization of synthetic resin from occurring due to high temperature molten metal.

The synthetic resin may be sprayed from the plurality of synthetic resin spray holes 230 and may serve to attach the molten metal. That is, while the molten metal is cooled and thereby sprayed, the molten metal may be manufactured into mineral fibers and synthetic resin may be sprayed between mineral fibers to fill in a space between the mineral fibers.

Here, the temperature of the molten metal is significantly high, which may lead to carbonizing the synthetic resin sprayed from the plurality of synthetic resin spray holes 230.

Accordingly, an improvement in the mineral fiber manufacturing efficiency may require a protection of synthetic resin, which may be achieved by the cooling water sprayed from the plurality of cooling water spray holes O.

In detail, the first spinner 212 may include four cooling water spray holes 2122, 2124, 2126, and 2128, the second spinner 214 may include four cooling water spray holes 2142, 2144, 2146, and 2148, the third spinner 216 may include four cooling water spray holes 2162, 2164, 2166, and 2168, and the fourth spinner 218 may include two cooling water spray holes 2182 and 2184.

Even though FIG. 2 illustrates that each spinner includes four cooling water spray holes, it is only an example and thus, the number of cooling water spray holes is not limited thereto.

Hereinafter, a description will be made based on an example in which two or four cooling water spray holes are provided on each spinner.

The four cooling water spray holes 2122, 2124, 2126, and 2128 provided on the first spinner 212 may be arranged at equal intervals on the slope S of the first spinner 212.

For example, the four cooling water spray holes 2122, 2124, 2126, and 2128 may be arranged at intervals of 90 degrees.

The four cooling water spray holes 2142, 2144, 2146, and 2148 provided on the second spinner 214 may be arranged at equal intervals on the slope S of the second spinner 214.

For example, the four cooling water spray holes 2142, 2144, 2146, and 2148 may be arranged at intervals of 90 degrees.

The four cooling water spray holes 2162, 2164, 2166, and 2168 provided on the third spinner 216 may be arranged at equal intervals on the slope S of the third spinner 216.

For example, the four cooling water spray holes 2162, 2164, 2166, and 2168 may be arranged at equal intervals of 90 degrees.

The two cooling water spray holes 2182 and 2184 provided on the fourth spinner 218 may be arranged at the equal interval on the slope S of the fourth spinner 218.

For example, the two cooling water spray holes 2182 and 2184 may be arranged at an interval of 180 degrees on the slope S of the fourth spinner 218.

As described above, four cooling water spray holes are provided to each spinner included in the spinner assembly 210, and are arranged at intervals of 90 degrees. However, in an example in which three cooling water spray holes are provided to each spinner, the three cooling water spray holes may be arranged at intervals of 120 degrees.

Also, the number of cooling water spray holes 2182 and 2184 provided to the fourth spinner 218 may be less than each of the number of cooling water spray holes 2122, 2124, 2126, and 2128 provided to the first spinner 212, the number of cooling water spray holes 2142, 2144, 2146, and 2148 provided to the second spinner 214, and the number of cooling water spray holes 2162, 2164, 2166, and 2168 provided to the third spinner 216.

The molten metal discharged through the outlet 120 of the furnace 100 may be sufficiently cooled while passing through the first spinner 212, the second spinner 214, and the third spinner 216 and thus, may be mostly manufactured into mineral fibers around a time at which the molten metal reaches the fourth spinner 218.

Accordingly, since the fourth spinner 218 does not need to spray the large quantity of cooling water, a relatively small number of cooling water spray holes may be enough for the fourth spinner 218.

Further, the plurality of air spray holes 220 may be disposed at an outsider side of each spinner included in the spinner assembly 210.

In the spinner assembly 210, the air spray hole 220 may be disposed to be lower than the cooling water spray hole.

The plurality of air spray holes 220 may be disposed along a portion of the outer periphery of each spinner included in the spinner assembly 210.

For example, the plurality of air spray holes 220 may be disposed on each of the right of the first spinner 212, the left of the second spinner 214, the right of the third spinner 216, and the left of the fourth spinner 218.

The plurality of air spray holes 220 may not be disposed at a location at which the first spinner 212, the second spinner 214, the third spinner 216, and the fourth spinner 218 are adjacent to one another.

The air sprayed from the plurality of air spray holes 220 may serve to guide the travel path of the molten metal rotated by the spinner assembly 210.

In detail, the sprayed air may guide the molten metal to move forward along the first spinner 212, the second spinner 214, the third spinner 216, and the fourth spinner 218 on both sides of the spinner assembly 210.

The quantity or a spray speed of air sprayed from the plurality of air spray holes 220 may be controlled by the controller.

The plurality of synthetic resin spray holes 230 may be provided at an outer side of the plurality of air spray holes 220.

As described above, synthetic resin may be sprayed from the plurality of synthetic resin spray holes 230. For example, resin may be used for synthetic resin.

Referring to FIG. 2, since a nozzle is connected to the synthetic resin spray hole 230, synthetic resin may be sprayed through the nozzle toward the molten metal passing the spinner assembly 210.

The synthetic resin may serve to attach the molten metal.

Also, a material state of the synthetic resin sprayed from the plurality of synthetic resin spray holes 230 may be protected by the cooling water sprayed from the plurality of cooling water spray holes.

As described above, the molten metal discharged through the outlet 120 of the furnace 100 may be manufactured into mineral fibers through the mineral fiber manufacturer 200.

The manufactured mineral fibers may be collected by the collector 300.

Referring to FIG. 5, the collector may include a vibrating leveler 310 and a vertical pendulum 320 configured to apply a vibration to mineral fibers to have a predetermined density and thickness, a forming M/C 330 configured to form the mineral fibers processed to have the predetermined density and thickness by the vibrating leveler 310 and the vertical pendulum 320, a cutting M/C 340 configured to cut the mineral fibers compressed by the forming M/C 330 based on a predetermined size, and a packaging M/C 350 configured to package the mineral fibers cut by the cutting M/C 340.

In this instance, the controller may control operations of the vibrating leveler 310, the vertical pendulum 320, the forming M/C 330, the cutting M/C 340, and the packaging M/C 350.

For example, an operator may set an operating time and a vibrating level of each of the vibrating leveler 310 and the vertical pendulum 320, and may also set an operating time and pressure strength of the forming M/C 330.

A mineral fiber manufacturing apparatus according to an embodiment is described above and a cooling water spray apparatus according to an embodiment is described hereinafter.

The cooling water spray apparatus according to an embodiment may include a plurality of spinners disposed to be adjacent to one another along a travel path of a target to be cooled and a plurality of cooling water spray holes provided on each spinner and configured to spray cooling water.

The plurality of spinners and the plurality of cooling water spray holes may correspond to the plurality of spinners and the plurality of cooling water spray holes provided to the mineral fiber manufacturer 200 of the mineral fiber manufacturing apparatus 10 according to the embodiment.

In detail, neighboring spinners among the plurality spinners may rotate in opposite directions.

Also, a diameter of a spinner disposed in an upper portion among the plurality of spinners may be less than a diameter of a spinner disposed in a lower portion among the plurality of spinners, and a rotational speed of a spinner disposed in an upper portion among the plurality of spinners may be greater than a rotational speed of a spinner disposed in a lower portion among the plurality of spinners.

The number of cooling water spray holes formed in a spinner disposed in an upper portion among the plurality of spinners may be greater than the number of cooling water spray holes formed in a spinner disposed in a lower portion among the plurality of spinners, and a slope may be provided on a top surface of each of the plurality of spinners and downwardly slanted from a center of a corresponding spinner toward an outer periphery of the spinner at an angle of 25 degrees to 35 degrees.

The plurality of cooling water spray holes may be arranged on the slope to be arranged at equal intervals from the center of the spinner, so that the cooling water is obliquely sprayed from the plurality of cooling water spray holes toward the target to be cooled.

The aforementioned cooling water spray apparatus and mineral fiber manufacturing apparatus including the same according to embodiments may smoothly manufacture mineral fibers by improving the cooling efficiency of cooling water sprayed from cooling water spray holes and thereby preventing the carbonization of synthetic resin, may provide a plurality of spinners to be non-overlappingly disposed with respect to one another, having differing rotation directions, rotational speeds, and diameters, and may provide cooling water spray holes arranged on a slope that is provided on a top surface of each of the plurality of spinners, thereby enabling cooling water to be obliquely sprayed from the cooling water spray holes in a radial form, and may fiberize molten metal and guide a travel path of the molten metal by providing a plurality of air spray holes on an outer side of a spinner or a plurality of cooling water spray holes.

Figure 6:
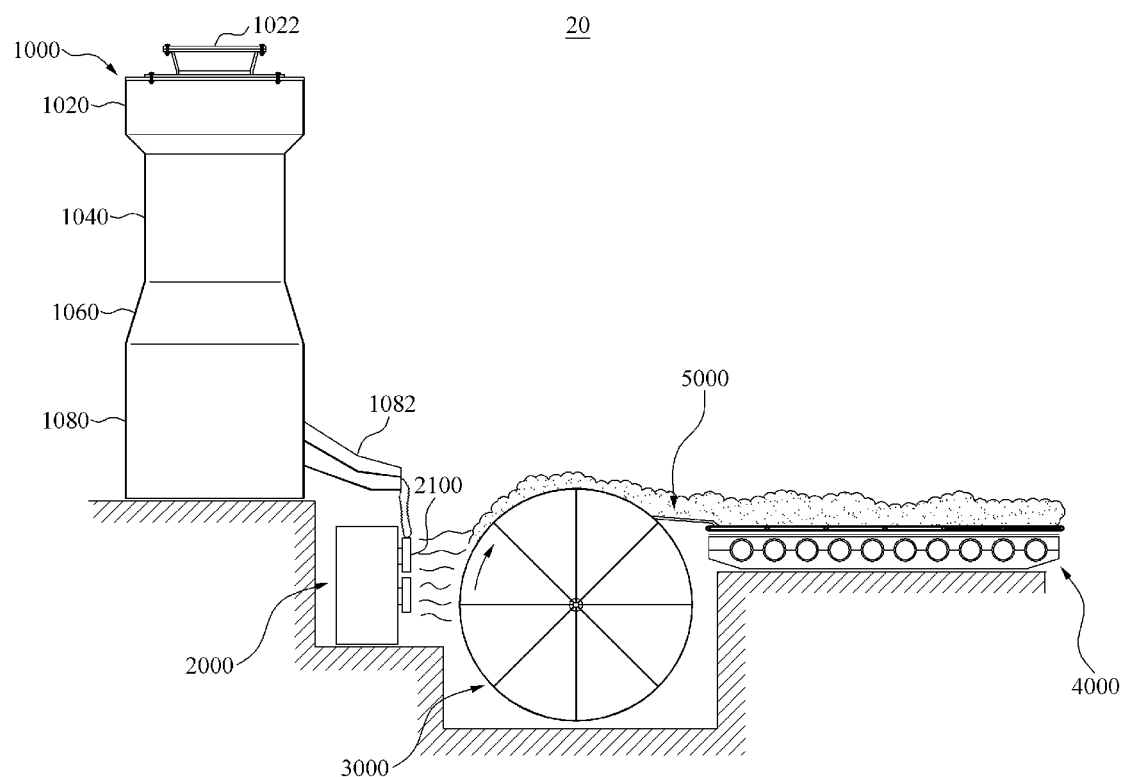
FIG. 6 illustrates a configuration of a mineral fiber manufacturing apparatus according to an embodiment.
Figure 7:
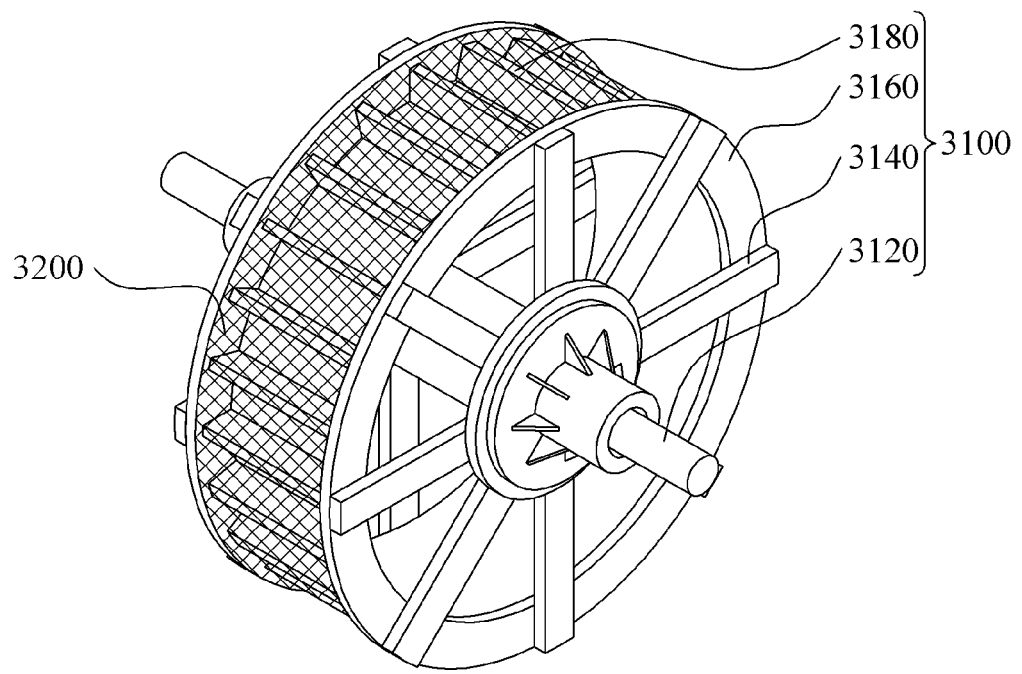
FIG. 7 is a perspective view illustrating a collector of a mineral fiber manufacturing apparatus according to an embodiment.
Figure 8:
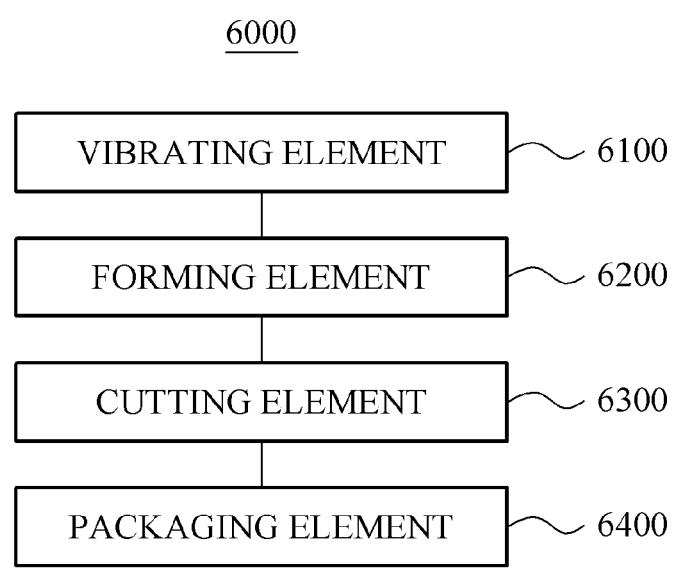
FIG. 8 is a block diagram illustrating a configuration of a mineral fiber processor of a mineral fiber manufacturing apparatus according to an embodiment.

FIG. 6 illustrates a configuration of a mineral fiber manufacturing apparatus according to an embodiment, FIG. 7 is a perspective view illustrating a collector of a mineral fiber manufacturing apparatus according to an embodiment, and FIG. 8 is a block diagram illustrating a configuration of a mineral fiber processor of a mineral fiber manufacturing apparatus according to an embodiment.

Referring to FIGS. 6 and 8, the mineral fiber manufacturing apparatus 20 may include a furnace 1000, a mineral fiber manufacturer 2000, a collector 3000, a conveyor 4000, a separator 5000, and a mineral fiber processor 6000.

The furnace 1000 may include a first division 1020, a second division 1040, a third division 1060, and a fourth division 1080.

The furnace 1000 may be divided into a total of four divisions from an upper end of the furnace 1000 to a lower end of the furnace 1000. The first division 1020, the second division 1040, the third division 1060, and the fourth division 1080 may communicate with each other.

In detail, the first division 1020 may extend from the upper end of the furnace 1000 toward the lower end of the furnace 1000. Here, a portion of the first division 1020 adjacent to an inlet 1022 may extend with a predetermined diameter, and a portion of the first division 1020 adjacent to the second division 1040 may be provided in a cone shape with a decreasing diameter.

The inlet 1022 through which coal briquette and cokes for manufacturing mineral fibers are inserted may be provided at an upper end of the first division 1020.

In this instance, coal briquette and cokes inserted through the inlet 1022 may move toward the first division 1020, the second division 1040, the third division 1060, and the fourth division 1080, and may be stacked from the fourth division 1080 toward the first division 1020.

Hereinafter, coal briquette and cokes inserted through the inlet 1022 will be described.

The coal briquette may be produced by mixing and press-forming coal ashes, dolomite ($CaMg(CO_3)_2$), and limestone.

In detail, the coal ashes refer to residual ashes after burning coal in a thermoelectric plant and the like, and may be classified based on grain sizes of particles of coal ashes and thereby maintained.

The dolomite $CaMg(CO_3)_2$ includes barytocalcite in which calcium carbonate and magnesium carbonate are mixed at a 1:1 ratio, and indicates a rhombus crystal, and a crystal face is slightly curved. Further, the dolomite has a gradient of 3.5 to 4, has a weight of 2.8 to 2.9, and has a complete split in a rhombus direction.

The limestone generally refers to fine-grained and bulky apedal rock. An appearance color of limestone may be white or gray in color, and with dark gray or black impurities.

The coal ashes, dolomite, and limestone may be transported and stored based on a grain size unit having a predetermined range to be uniformly mixed. Here, a storage of coal ashes, dolomite, and limestone may include a plurality of weighing equipments.

Although not illustrated in detail, a coal briquette manufacture for manufacturing coal briquette may be provided. Coal ashes, dolomite, and limestone may be simultaneously fed to the coal briquette manufacturer at a preset mixture ratio, and preset quantitative special bonding materials may also be inserted therein.

Further, the mixture ratio may be selectively adjusted if necessary. The mixture ratio between each material and special bonding materials may also be variably applied.

An appearance color of cokes may be black with gray shading and also has metallic gloss. The cokes have fixed carbon as a primary component and slightly contain ash content and volatile matter. In terms of technical analysis values, the cokes generally include 80 to 94% fixed carbon, 6 to 18% ash content, and 0.5 to 2% volatile matter. In terms of elementary analysis values, the cokes include 80 to 92% carbon, 1 to 1.5% hydrogen, 0.5 to 0.9% nitrite, 0.4 to 0.7% oxygen, 0.5 to 1% sulfur, and 6 to 18% volatile matter. Also, the cokes have a caloric power of 6000 to 7500 kilocalories (kcal) per 1 kilogram (kg), and have an ignition temperature of 400 to 600° C.

The aforementioned coal briquette and cokes may be alternately inserted in the furnace 1000.

For example, when cokes are inserted in the furnace 1000 through the inlet 1022, coal briquette may be inserted through the inlet 1022. Next, cokes may be inserted through the inlet 1022 and then coal briquette may be inserted again through the inlet 1022.

As described above, by alternately inserting coal briquette and cokes in the furnace 1000, it is possible to efficiently melt the coal briquette, thereby enhancing the manufacturing efficiency of mineral fibers.

A first exhaust gas outlet (not shown) through which exhaust gas by combustion of cokes is discharged may be provided to the first division 1020.

For example, the first exhaust gas outlet may be provided on one side of the first division 1020, for example, one side of a portion in which the first division 1020 has a predetermined diameter.

The high temperature of exhaust gas may be generated with cokes being combusted in the furnace 1000. The exhaust gas generated in a lower portion of the furnace 1000, for example, the third division 1060 or the fourth division 1080 may be transported toward the first division 1020 and may be externally discharged from the furnace 1000 through the first exhaust gas outlet.

Here, the exhaust gas discharged through the first exhaust gas outlet may be at the temperature of about 900° C. to 1000° C. and the exhaust gas may include impurities in addition to gas.

Also, coal briquette and cokes inserted in the furnace 1000 may be stacked up to a location lower than a location of the first exhaust gas outlet in the first division 1020. Further, as melting of coal briquette and combustion of cokes are ongoing in the furnace 1000, a height of coal briquette and cokes stacked in the furnace 1000 may gradually decrease.

As described above, from the height of coal briquette and cokes stacked in the furnace 1000, it is possible to predict a progress status about melting of coal briquette and combustion of cokes in the furnace 1000. Further, it is possible to determine whether coal briquette and cokes are to be additionally inserted.

The second division 1040 may be disposed below the first division 1020.

The second division 1040 may be connected at the lower end of the first division 1020, and may downwardly extend therefrom with a predetermined diameter.

Here, a plurality of water jackets (not shown) may be provided to wrap around the outside of the second division 1040.

By cooling water circulating through the plurality of water jackets, the heat transferred from an inner wall of the furnace 1000 to an outer wall of the furnace 1000 may be cooled down.

The third division 1060 may be disposed below the second division 1040.

The third division 1060 may be connected at a lower end of the second division 1040 and may downwardly extend therefrom with an increasing diameter.

The fourth division 1080 may be disposed below the third division 1060.

The fourth division 1080 may be connected at a lower end of the third division 1060 and may downwardly extend therefrom with a predetermined diameter.

In detail, a molten metal outlet 1082 through which a molten metal in which coal briquette is melted is discharged may be provided on one side of a lower portion of the fourth division 1080.

The molten metal discharged through the molten metal outlet 1082 may be transported to the mineral fiber manufacturer 2000 and may be produced into mineral fibers.

Although not illustrated in detail, a burner mounter may be provided on another side of the fourth division 1080 and a burner (not shown) for igniting cokes may be provided within the burner mounter.

While coal briquette and cokes fed through the inlet 1022 of the furnace 1000 is going through a process of a preheating zone, a reducing zone, a combusting zone, and a melting zone, organic compounds of mineral fibers contained in the coal briquet may be melted.

Here, a controller (not shown) may control the quantity of air and oxygen to be inserted in order to sufficiently excessively supply oxygen in the reducing zone and thereby increase the combustion efficiency.

The controller may control an inner temperature and an exhaust temperature of the furnace 1000, so that the inner temperature of the furnace 1000 is maintained at the temperature of about 1500° C., and the exhaust temperature of the furnace 1000 is maintained at the temperature of about 900 to 1000° C.

Here, the inner temperature of the furnace 1000 may reach a high temperature enough to melt coal briquet and cokes.

Accordingly, an outside iron plate of the furnace 1000 and refractory built inside the furnace 1000 may be designed to have a sufficient thickness to be capable of enduring a high temperature inside the furnace 1000. Depending on necessity, a variety of cooling methods may be employed.

Further, the controller may control a melting rate within the furnace 1000, the quantity of materials to be inserted through the inlet 1022 of the furnace 1000, and the like.

Through the aforementioned process, coal briquette and cokes inserted through the inlet 1022 may be discharged in a form of exhaust gas or a molten metal.

The mineral fiber manufacturer 2000 may be disposed on one side of the furnace 1000.

In detail, the mineral fiber manufacturer 2000 may be provided so that the molten metal discharged through the molten metal outlet 1082 may flow. For example, the mineral fiber manufacturer 2000 may be disposed to be below the furnace 1000, particularly, the molten metal outlet 1082 of the furnace 1000.

A plurality of spinners 2100 may be provided to the mineral fiber manufacturer 2000.

The plurality of spinners 2100 may be disposed in a flow direction of the molten metal, and the molten metal may move on the plurality of spinners 2100 or a space between the plurality of spinners 2100.

Although not illustrated in detail, an air spray hole or a cooling water spray hole capable of cooling the molten metal may be provided to the mineral fiber manufacturer 2000.

Further, although not illustrated in detail, a synthetic resin spray hole capable of spraying synthetic resin toward the molten metal may be provided to the mineral fiber manufacturer 2000 to generate adhesive strength in the cooled molten metal.

As described above, while the molten metal discharged through the molten metal outlet 1082 passes through the mineral fiber manufacturer 2000, mineral fibers in the bulk state may be produced.

The mineral fibers in the bulk state may be collected in the collector 3000.

For example, the collector 3000 may be disposed to be separate from one side of the mineral fiber manufacturer 2000. An upper end of the collector 3000 may be disposed to be above the mineral fiber manufacturer 2000 and a lower end of the collector 3000 may be disposed to be below the mineral fiber manufacturer 2000.

The above arrangement may uniformly spread mineral fibers in the bulk state over the collector 3000 while the mineral fibers are upwardly moving along the surface of the collector 3000.

Referring to FIG. 7, the collector 3000 may include a rotating body 3100 and a net 3200.

The rotating body 3100 may include a rotating shaft 3120, a plurality of rotating wings 3140, a plurality of circular frames 3160, and a plurality of plates 3180.

The rotating shaft 3120 may extend in a direction vertical to a heading direction of mineral fibers. For example, when the furnace 1000, the mineral fiber manufacturer 2000, and the collector 3000 included in the mineral fiber manufacturing apparatus 20 are aligned on the same line at predetermined distances, the rotating shaft 3120 may extend in a direction vertical to the same line.

The plurality of rotating wings 3140 may extend from both ends of the rotating shaft 3120 in a radial direction. Here, the plurality of rotating wings 3140 may be aligned at equal angles along the outer peripheral surface of the rotating shaft 3120. The plurality of rotating wings 3140 provided at one end of the rotating shaft 3120 and the plurality of rotating wings 3140 provided at another end of the rotating shaft 3120 may be symmetrically formed.

The circular frame 3160 may be configured to connect ends of the plurality of rotating wings 3140 at both ends of the rotating shaft 3120.

For example, one end of the circular frame 3160 may be configured to connect ends of the plurality of rotating wings 3140 provided at one end of the rotating shaft 3120, and another end of the circular frame 3160 may be configured to connect ends of the plurality of rotating wings 3140 provided at another end of the rotating shaft 3120.

The plurality of plates 3180 may be disposed to be separate from each other along the outer peripheral surface of the circular frame 3160, and may protrude from the outer peripheral surface of the circular frame 3160 in a radial direction.

As described above, the collector 3000 includes the rotating body 3100, and may rotate mineral fibers in the bulk state collected by the collector 3000.

For example, the rotating body 3100 may clockwise rotate and thereby upwardly move the mineral fibers in the bulk state collected by the collector 3000.

Here, the net 3200 may be provided along the outer peripheral surface of the rotating body 3100. A portion of or an entirety of the rotating body 3100 may be wrapped around by the net 3200. Accordingly, the surface of the collector 3000 may be flattened by filling in a space between the plurality of plates 3180.

Also, the net 3200 may fix the collected mineral fibers in the bulk state to the collector 3000. Mineral fibers in contact with the net 3200 may not be separated from the collector 3000 by rotation of the rotating body 3100 and may move in a rotating direction of the rotating body 3100.

In contrast, mineral fibers not in contact with the net 3200 are not fixed to the collector 3000 and thus, may be uniformly spread over the surface of the collector 3000 while mineral fibers in the bulk state are upwardly moving by rotation of the rotating body 3100.

Here, an angle at which the rotating body 310 rotates or a travel distance of mineral fibers on the net 3200 may be associated with a spread level of mineral fibers on the surface of the collector 3000.

Accordingly, the collector 3000 may be easily configured using the rotating body 3100 and the net 3200, and mineral fibers in the bulk state may be efficiently and uniformly spread.

The conveyor 4000 may be provided on one side of the collector 3000.

The conveyor 4000 may be disposed to face the mineral fiber manufacturer 2000 based on the collector 3000. Accordingly, the molten metal discharged from the furnace 1000 may be sequentially transferred to the mineral fiber manufacturer 2000, the collector 3000, and the conveyor 4000.

The conveyor 4000 may serve to transfer mineral fibers collected by the collector 3000 to the mineral fiber processor 6000.

Also, the separator 5000 may be disposed between the collector 3000 and the conveyor 4000.

The separator 5000 is configured to separate mineral fibers from the collector 3000, particularly, the net 3200. One end of the separator 5000 may be in contact with the outer peripheral surface of the collector 3000 and another end of the separator 5000 may be disposed on a top surface of the conveyor 4000.

Accordingly, mineral fibers separated from the collector 3000 by way of the separator 5000 may be transferred to the conveyor 4000.

The mineral fibers may be transported from the conveyor 4000 to the mineral fiber processor 6000.

Referring to FIG. 8, the mineral fiber processor 6000 may include a vibrating element 6100, a forming element 6200, a cutting element 6300, and a packaging element 6400.

The vibrating element 6100 may vibrate mineral fibers transported from the conveyor 4000 in a vertical or horizontal direction.

Accordingly, mineral fibers may be processed to have a preset density and thickness. Accordingly, a homogeneous mineral fiber product may be produced.

The forming element 6200 may be configured to press-form the mineral fibers and may reduce a size of a pore present between the mineral fibers and may enhance the density of mineral fibers.

The cutting element 6300 may be configured to cut mineral fibers in a predetermined size. For example, the cutting element 6300 may cut mineral fibers press-formed by the forming element 6200 or may cut mineral fibers vibrated by the vibrating element 6100.

The packaging element 6400 may be configured to package mineral fibers. For example, the packaging element 6400 may package mineral fibers press-formed by the forming element 6200 or may package mineral fibers vibrated by the vibrating element 6100.

Here, a controller (not shown) may control operations of the vibrating element 6100, the forming element 6200, the cutting element 6300, and the packaging element 6400.

For example, an operator may set an operating time and a vibration level of the vibrating element 6100, and may also set an operating time and pressure strength of the forming element 6200.

A mineral fiber manufacturing apparatus according to an embodiment is described and a mineral fiber manufacturing method according to an embodiment will be hereinafter described.

Figure 9:
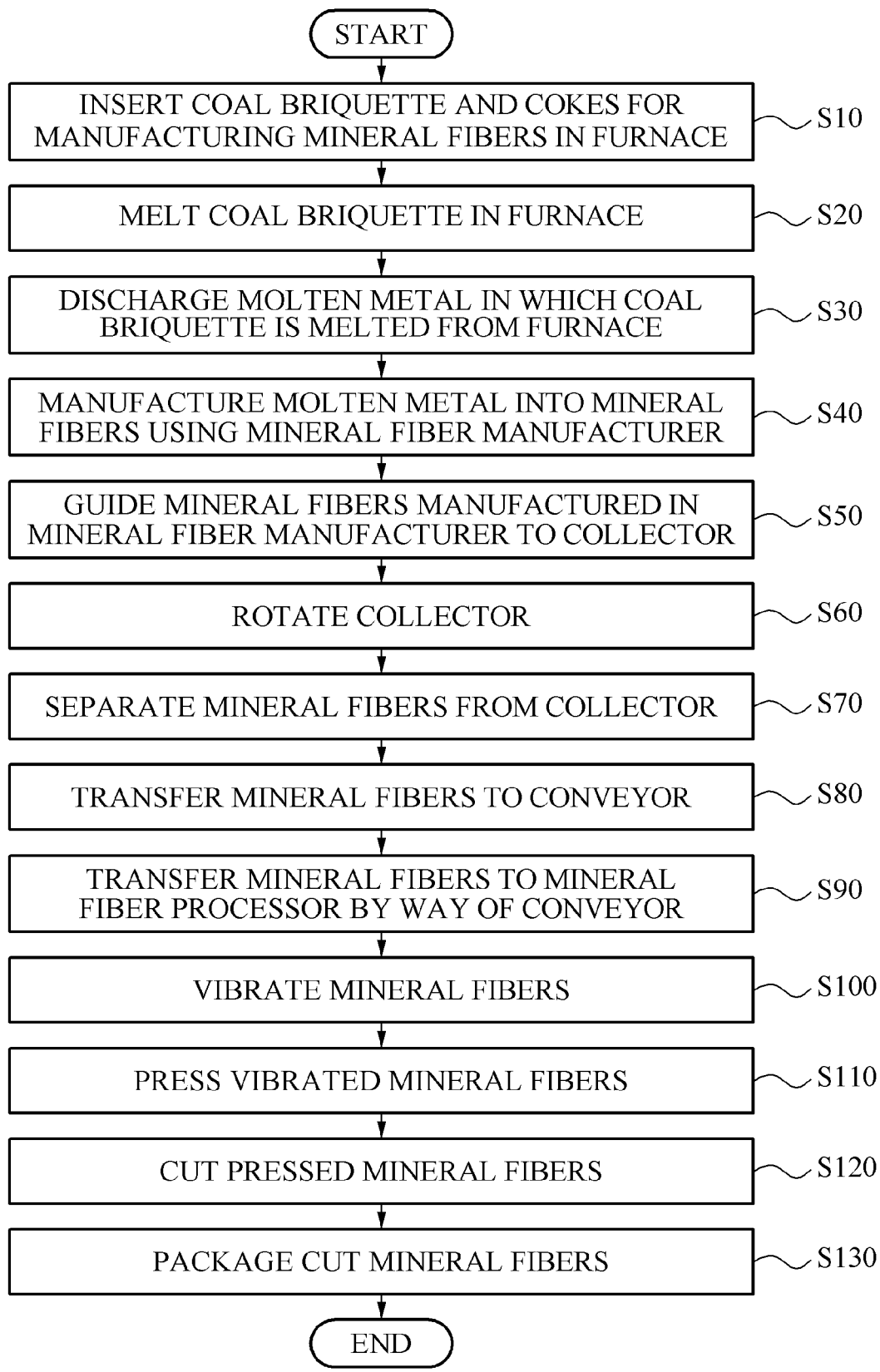
FIG. 9 is a flowchart illustrating a mineral fiber manufacturing method according to an embodiment.

FIG. 9 is a flowchart illustrating a mineral fiber manufacturing method according to an embodiment.

Referring to FIG. 9, mineral fibers may be manufactured as follows.

In operation S10, coal briquette and cokes for manufacturing mineral fibers are inserted in a furnace.

Here, coal briquette and cokes may be alternately inserted in the furnace. When a relatively large amount of cokes is inserted in the furnace, coal briquette may be inserted in the furnace. Cokes and coal briquette may be sequentially inserted in the furnace. Coal briquette and cokes may be stacked from a bottom of the furnace toward a top of the furnace.

In operation S20, coal briquette is melted in the furnace.

An inner temperature of the furnace may be increased by combusting cokes located on the bottom of the furnace. Due to the heat, coal briquette may be melted.

Here, the inner temperature of the furnace may be high enough to melt coal briquette and cokes, and may be increased up to about 1500° C.

In operation S30, a molten metal in which the coal briquette is melted is discharged from the furnace.

A high temperature molten metal may be discharged from the furnace through a molten metal outlet disposed on one side of the furnace.

In operation S40, the high temperature molten metal may be guided to a mineral fiber manufacturer, and may be manufactured into mineral fibers in the mineral fiber manufacturer.

Adhesive strength may be applied to the high temperature molten metal by synthetic resin at the same time at which the high temperature molten metal is cooled in the mineral fiber manufacturer. The high temperature molten metal may be manufactured into mineral fibers in a bulk state.

Here, cooling performed in the mineral fiber manufacturer may serve to cool the molten metal and also to prevent melting of synthetic resin by the high temperature molten metal.

In operation S50, mineral fibers manufactured in the mineral fiber manufacturer are guided to a collector.

The collector may include a rotating body and a net. The net may be provided to wrap around the rotating body.

In operation S60, the collector rotates.

Mineral fibers may move in a rotating direction of the collector on the surface of the collector. For example, the collector may clockwise rotate and mineral fibers in the bulk state manufactured in the mineral fiber manufacturer may be uniformly spread over the surface of the collector while moving along the surface of the collector.

In operation S70, mineral fibers uniformly spread over the surface of the collector are separated from the collector.

Mineral fibers fixed to the net of the collector may be separated from the collector by a separator in contact with the surface of the collector, for example, disposed in a tangential direction of the collector.

In operation S80, the mineral fibers are transferred to a conveyor.

One end of the separator is in contact with the surface of the collector and another end of the separator is disposed on the conveyor and thus, mineral fibers separated from the collector may be naturally transferred to the conveyor.

In operation S90, the mineral fibers are transported to a mineral fiber processor by way of the conveyor.

In detail, mineral fibers may be processed in the mineral fiber processor according to the following process.

In operation S100, the mineral fibers are vibrated.

Mineral fibers may be vibrated in a horizontal or vertical direction by a vibrating element.

In operation S110, the vibrated fibers are pressed.

Here, mineral fibers may be press-formed by a pressing element to have a predetermined density.

In operation S120, the pressed mineral fibers are cut.

A user may cut mineral fibers in a desired shape.

In operation S130, the cut mineral fibers are packaged.

Through the aforementioned process, a final mineral fiber product may be produced. Primarily, mineral fibers may be uniformly spread in the collector. Secondarily, the mineral fibers may be vibrated by the vibrating element and be produced into a homogeneous mineral fiber product.

As described above, a mineral fiber manufacturing apparatus and method according to an embodiment may uniformly spread mineral fibers in a bulk state manufactured in a mineral fiber manufacture over the surface of a collector, may easily configure a drum-type collector by wrapping a net around a rotating body, and may separate mineral fibers from the collector using a separator in contact with the outer peripheral surface of the collector and transfer the separated mineral fibers to a conveyor.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A mineral fiber manufacturing apparatus comprising:
   a furnace comprising an inlet via which raw materials for manufacturing mineral fibers are inserted and an outlet via which molten metal comprising the inserted raw materials in a melted form is discharged;
   a mineral fiber manufacturer configured to manufacture the molten metal discharged via the outlet of the furnace, into mineral fibers; and a collector configured to collect the mineral fibers discharged from the mineral fiber manufacturer, wherein the mineral fiber manufacturer comprises a plurality of spinners disposed to be adjacent to one another along a travel path of the molten metal, wherein a slope is provided on a top surface of each of the plurality of spinners and downwardly slanted from a center of a corresponding spinner toward an outer periphery of the spinner at an angle of 25 degrees to 35 degrees, wherein a plurality of cooling water spray holes are arranged on the slope at equal intervals from the center of the spinner, so that a cooling water is obliquely sprayed from the plurality of cooling water spray holes toward the molten metal, wherein a plurality of synthetic resin spray holes are provided at an outer side of each of the plurality of spinners, and mineral fibers manufactured by the mineral fiber manufacturer are attachable due to synthetic resin sprayed via the plurality of synthetic resin spray holes, wherein a plurality of air spray holes are provided at an outer side of each of the plurality of spinners, the molten metal is fiberized by the air sprayed via the plurality of air spray holes and the travel path of the molten metal is guided, and wherein the plurality of synthetic resin spray holes surrounds the outer side of each of the plurality of spinners such that the plurality of air spray holes are provided between each of the plurality of spinners and the plurality of synthetic resin spray holes corresponding to each of the plurality of spinners, and the synthetic resin and the cooling water are respectively sprayed by the plurality of synthetic resin spray holes and the plurality of air spray holes.

2. The mineral fiber manufacturing apparatus of claim 1, wherein the plurality of spinners comprises:
   a first spinner disposed on a side in which the molten metal flows;
   a second spinner disposed to be downwardly separate from the first spinner;
   a third spinner disposed to be downwardly separate from the second spinner; and
   a fourth spinner disposed to be downwardly separate from the third spinner, and
   the first spinner, the second spinner, the third spinner, and the fourth spinner are arranged in a zigzagged form.

3. A mineral fiber manufacturing apparatus comprising: a furnace comprising an inlet through which coal briquette and cokes for manufacturing mineral fibers are inserted and a molten metal outlet through which a molten metal in which the coal briquette is melted is discharged;
   a mineral fiber manufacturer disposed below the furnace, and configured to manufacture the molten metal discharged through the molten metal outlet into mineral fibers in a bulk state wherein the mineral fiber manufacturer comprises a plurality of spinners disposed to be adjacent to one another along a travel path of the molten metal,
   wherein a slope is provided on a top surface of each of the plurality of spinners and downwardly slanted from a center of a corresponding spinner toward an outer periphery of the spinner at an angle of 25 degrees to 35 degrees,
   wherein a plurality of cooling water spray holes are arranged on the slope at equal intervals from the center of the spinner, so that a cooling water is obliquely sprayed from the plurality of cooling water spray holes toward the molten metal,
   wherein a plurality of synthetic resin spray holes are provided at an outer side of each of the plurality of spinners, and mineral fibers manufactured by the mineral fiber manufacturer are attachable due to synthetic resin sprayed via the plurality of synthetic resin spray holes,
   wherein a plurality of air spray holes are provided at an outer side of each of the plurality of spinners, the molten metal is fiberized by the air sprayed via the plurality of air spray holes and the travel path of the molten metal is guided, and
   wherein the plurality of synthetic resin spray holes surrounds the outer side of each of the plurality of spinners such that the plurality of air spray holes are provided between each of the plurality of spinners and the plurality of synthetic resin spray holes corresponding to each of the plurality of spinners, and the synthetic resin and the cooling water are respectively sprayed by the plurality of synthetic resin spray holes and the plurality of air spray holes; and a collector disposed to be separate from the mineral fiber manufacturer, and configured to collect the mineral fibers in the bulk state manufactured in the mineral fiber manufacturer, wherein the collector comprises a rotating body and the mineral fibers in the bulk state are uniformly spread over the outer peripheral surface of the rotating body.

4. The mineral fiber manufacturing apparatus of claim 3, wherein the collector further comprises a net configured to wrap around the rotating body, and the outer peripheral surface of the collector is flattened by the net.

5. The mineral fiber manufacturing apparatus of claim 4, wherein the rotating body comprises:
   a rotating shaft extending in a direction vertical to a heading direction of the mineral fibers;
   a plurality of rotating wings extending from both ends of the rotating shaft in a radial direction;
   a circular frame configured to connect ends of the plurality of rotating wings at both ends of the rotating shaft; and
   a plurality of plates disposed to be separate from each other along the outer peripheral surface of the circular frame and protruding from the outer peripheral surface of the circular frame in a radial direction,
   wherein the net is provided to wrap around a portion of or an entirety of the rotating body, and the mineral fibers in the bulk state manufactured in the mineral fiber manufacturer move in a rotating direction of the rotating body in contact with the net.

6. The mineral fiber manufacturing apparatus of claim 3, wherein an upper end of the collector is disposed to be above the mineral fiber manufacturer and a lower end of the collector is disposed to be below the mineral fiber manufacturer.

7. The mineral fiber manufacturing apparatus of claim 3, further comprising:
   a conveyor configured to transport the mineral fibers collected by the collector,
   wherein the conveyor is disposed to face the mineral fiber manufacturer based on the collector.

8. The mineral fiber manufacturing apparatus of claim 7, further comprising:
   a separator provided between the collector and the conveyor, wherein one end of the separator is in contact with the outer peripheral surface of the collector and another end of the separator is disposed on a top surface of the conveyor, and the mineral fibers moved by rotation of the rotating body are separated from the collector and transferred to the conveyor.

9. The mineral fiber manufacturing apparatus of claim 7, wherein the mineral fibers transferred to the conveyor are transported to a mineral fiber processor, and the mineral fiber processor comprises:
a vibrating element configured to vibrate the mineral fibers;
a forming element configured to press the mineral fibers;
a cutting element configured to cut the mineral fibers; and
a packaging element configured to package the mineral fibers.

10. A mineral fiber manufacturing method comprising:
inserting coal briquette and cokes for manufacturing mineral fibers in a furnace; melting the coal briquette in the furnace;

discharging a molten metal in which the coal briquette is melted from the furnace; manufacturing the molten metal into mineral fibers using a mineral fiber manufacturer, wherein the mineral fiber manufacturer comprises a plurality of spinners disposed to be adjacent to one another along a travel path of the molten metal, wherein a slope is provided on a top surface of each of the plurality of spinners and downwardly slanted from a center of a corresponding spinner toward an outer periphery of the spinner at an angle of 25 degrees to 35 degrees, wherein a plurality of cooling water spray holes are arranged on the slope at equal intervals from the center of the spinner, so that a cooling water is obliquely sprayed from the plurality of cooling water spray holes toward the molten metal, wherein a plurality of synthetic resin spray holes are provided at an outer side of each of the plurality of spinners, and mineral fibers manufactured by the mineral fiber manufacturer are attachable due to synthetic resin sprayed via the plurality of synthetic resin spray holes, wherein a plurality of air spray holes are provided at an outer side of each of the plurality of spinners, the molten metal is fiberized by the air sprayed via the plurality of air spray holes and the travel path of the molten metal is guided, and wherein the plurality of synthetic resin spray holes surrounds the outer side of each of the plurality of spinners such that the plurality of air spray holes are provided between each of the plurality of spinners and the plurality of synthetic resin spray holes corresponding to each of the plurality of spinners, and the synthetic resin and the cooling water are respectively sprayed by the plurality of synthetic resin spray holes and the plurality of air spray holes;

guiding the mineral fibers manufactured in the mineral fiber manufacturer to a collector; rotating the collector; transferring the mineral fibers to a conveyor; and transporting the mineral fibers to a mineral fiber processor by way of the conveyor, wherein the rotating of the collector comprises moving the mineral fibers in a rotating direction of the collector along the outer peripheral surface of the collector, and the rotating of the collector comprises uniformly spreading the mineral fibers in a bulk state manufactured in the mineral fiber manufacturer over the outer peripheral surface of the collector.

11. The mineral fiber manufacturing method of claim 10, further comprising:
separating the mineral fibers from the collector between the rotating of the collector and the transferring of the mineral fibers,
wherein the separating of the mineral fibers comprises separating the mineral fibers from the collector using a separator in contact with the outer peripheral surface of the collector, and transferring the separated mineral fibers to the conveyor.

12. The mineral fiber manufacturing method of claim 10, after transporting the mineral fibers to the mineral fibers, further comprising:
vibrating the mineral fibers;
pressing the vibrated mineral fibers;
cutting the pressed mineral fibers; and
packaging the cut mineral fibers.

* * * * *